WINDOW CLEANING DEVICE

Filed June 8, 1959

INVENTOR.
LEISER PRESSER.
BY
E. R. Sosnack
ATTORNEY

May 8, 1962 L. PRESSER 3,032,797

WINDOW CLEANING DEVICE

Filed June 8, 1959 4 Sheets-Sheet 2

*INVENTOR.*

LEISER PRESSER

*BY*

[signature]

ATTORNEY

May 8, 1962 L. PRESSER 3,032,797

WINDOW CLEANING DEVICE

Filed June 8, 1959 4 Sheets-Sheet 3

INVENTOR.
LEISER PRESSER

BY [signature]

ATTORNEY

*INVENTOR.*
LEISER PRESSER
*BY*
[signature]
ATTORNEY 3,032,797

WINDOW CLEANING DEVICE

Leiser Presser, 1367 46th St., Brooklyn, N.Y.

Filed June 8, 1959, Ser. No. 818,649
3 Claims. (Cl. 15—250.04)

This invention relates to a window cleaning apparatus of the type that is permanently mounted on the frame structures of windows, this being a continuation-in-part of my application filed June 6, 1958, Serial No. 740,325, now Patent No. 2,944,276.

It is an object of this invention, like that of my said prior invention, to provide a device which simultaneously and automatically cleans the opposite surfaces of a window pane. It is, in addition, a further important object to provide effective wetting or moistening means, coactive with the window wiping elements, which are fed from a house water supply system.

It is also an object of my invention, in certain forms thereof, to provide novel water spraying or moistening means movable with the wiper element and adapted to provide a wetting action in advance of the moving wiper element. And in this aspect of my invention it is a further object to provide laterally opposite wetting means, whereby there will be alternate moistenings at laterally opposite sides of a reciprocatingly movable wiper element. And in the connection with this last-mentioned alternating moistening means, it is my further object to cut off or reduce the supply of moistening fluid at the non-operative side of the wiper element during its movement along the window pane.

Another important object of this invention is the provision of automatic means for simultaneously actuating both oppositely positioned window cleaning elements and guiding them along predetermined paths in parallel relation to the plane of the window, and yet permitting such wiping elements to be operatively retracted out of engagement with the window. And in this aspect of my invention it is a further object to provide means for applying a window cleaning apparatus of the above category to double-hung windows.

Other objects, features and advantages will appear from the drawings and the description hereinafter given.

Referring to the drawings.

Figure 2:
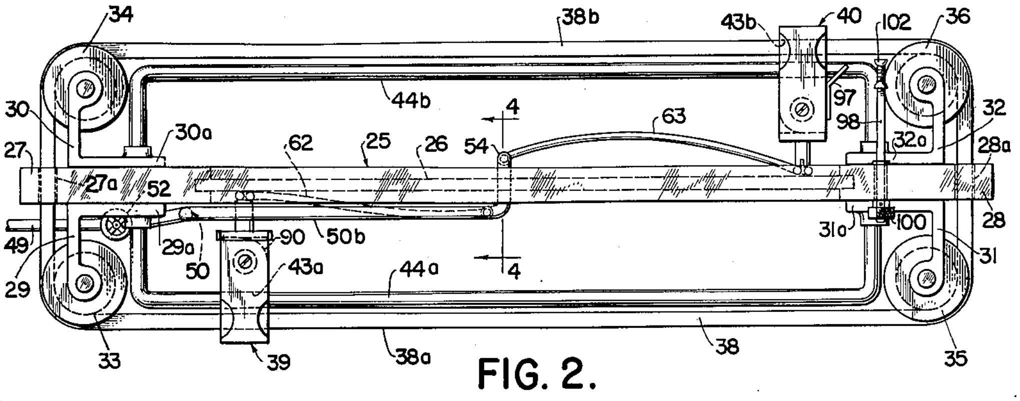
FIGURE 2 is a top view of FIGURE 1, with microswitches removed.

In the form of my invention illustrated in FIGURES 1–13, the window frame, generally designated 25 and supporting the window pane 26, has secured to the opposite lateral sections 27 and 28 thereof bracket members 29, 30, 31 and 32, respectively—the former two being mounted on the respective inner and outer surfaces of section 27, and the latter two on the respective inner and outer surfaces of said section 28. Rotatably supported by said brackets are the four pulleys 33, 34, 35 and 36, respectively, pulley 33 being affixed to the drive shaft 37, the other pulleys being idlers—drive shaft 37 being operatively connected to a motor not shown. Operatively mounted over said four pulleys is belt 38, said belt extending through apertures **27*a* and 28*a* in said respective window frame sections 27 and 28**, substantially in the manner described in my said prior application, Serial No. 740,325.

Fixedly secured to the inner section **38*a* of belt 38 is the inner wiper carrier member generally designated 39; and similarly fixedly secured to the outer section 38*b* of belt 38 is the outer wiper carrier member 40. As will be seen from FIGURES 1 and 6, the carrier member 39 (as well as the carrier member 40) contains two studs 41 and 42 which are in engagement with the belt 38, whereby the carrier members are held against movement relative to the belt, and are movable with the operative movement of the belt. Said carrier members also contain therein passageways 43*a* and 43*b***, through each of which slidably extends a guide bar substantially of the form shown in my said prior application. Specifically, the inner guide bar *44a* extends through the said passageway *43a* of the carrier member 39, and the outer guide bar *44b* extends through the passageway *43b* of the carrier member 40. Said guide bar *44a* is attached to the flanges *29a* and *31a* of the respective pulley brackets 29 and 31; and said guide bar *44b* is attached to the respective flanges *39a* and *32a* of the respective pulley brackets 30 and 32.

Mounted at opposite lateral sides of the window frame are the microswitches 45 and 46 with respective contact arms *45a* and *46a*. The said carrier member 39 contains on opposite lateral sides thereof the contact fingers 47 and 48, the said fingers being so positioned and proportioned that when the carrier member 39 is at the extreme left position, it will engage the contact arm *45a* to close the circuit through microswitch 45; and when said carrier member 39 is at the extreme right hand position, the finger 48 will engage the contact arm *46a* and close the circuit through microswitch 46. The said microswitches are operatively connected to the motor actuating the said drive shaft 37, the circuit being such that when microswitch 45 is actuated, the motor and consequently the shaft 37 will rotate in one direction; and when microswitch 46 is operatively actuated the motor and drive shaft 37 will rotate in the opposite direction, all in well-known manner. The circuit for effecting the reversible operation of drive shaft 37 are not shown, since it is well-known to those skilled in the art, a further description thereof not being necessary for an understanding of the present invention. Suffice it to say that when the said microswitches 45 and 46 are alternately actuated by the respective fingers 47 and 48 of the carrier member 39, the drive shaft and consequently the belt 38 will reverse their directions, whereby the carrier members 39 and 40 will also be caused to reverse their directions.

As will more clearly appear from the description hereinbelow given, the operative movements of said carrier members 39 and 40 cause the wiper elements to move across the entire width of the window, one wiper element being in engagement with the inside surface of the window and the other with the outside surface, the wiper elements being fed by novel wetting means.

Figures 1, 3, 4:
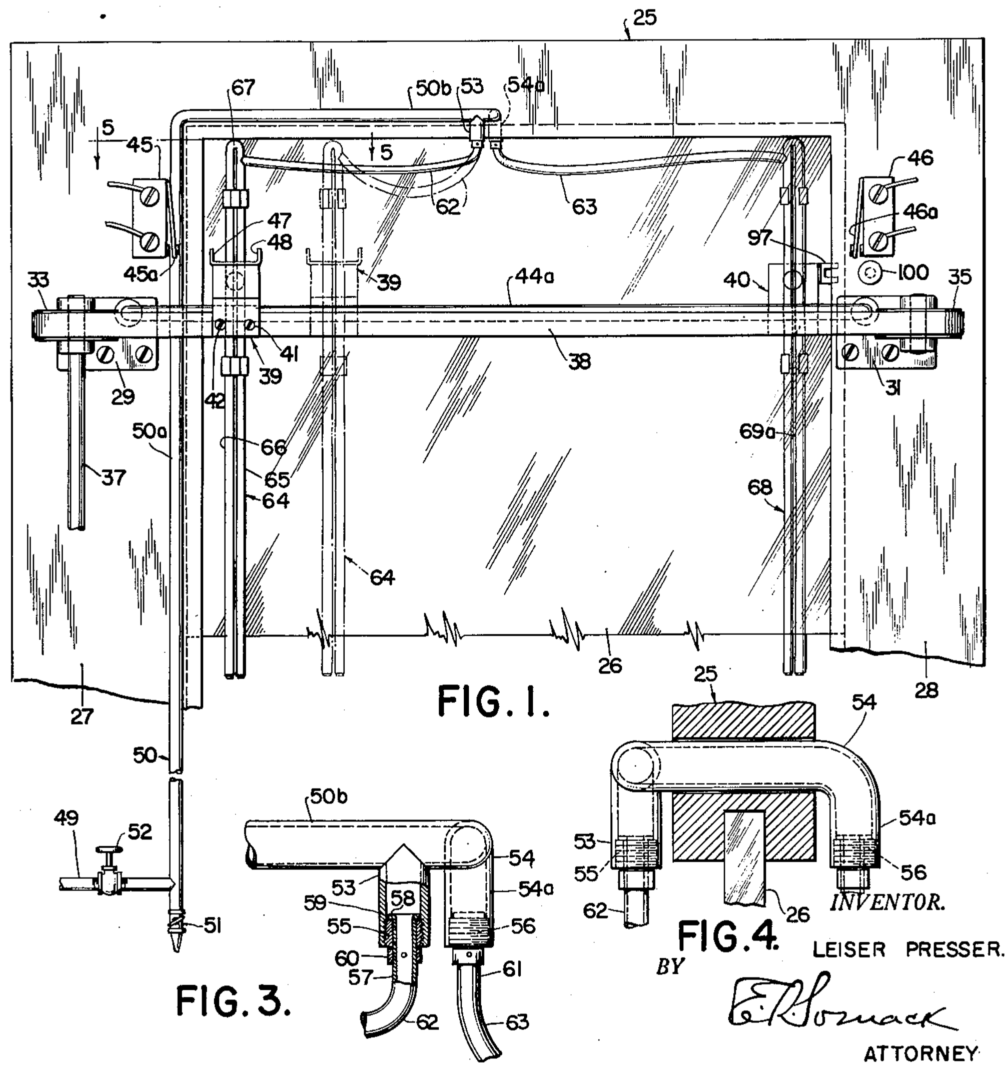
FIGURE 1 is a fragmentary front view of a window structure provided with an embodiment of my invention, the wiper members being shown adjacent their extreme opposite positions, the dot-dash lines showing a laterally inwardly disposed position of one of said wiper members.
FIGURE 3 is an enlarged fragmentary front elevational and part-sectional view of the pipe junction portions at the upper medial portion of FIGURE 1.
FIGURE 4 is an enlarged fragmentary section of FIGURE 2 taken along line 4—4.

A pipe 49 (FIG. 3), connected to a source of water supply, is joined to the riser 50 having at the lower terminal thereof the drain valve 51—a valve 52 controlling the flow of water into the riser 50. Said riser has a vertical section *50a* extending along the side of the window, and then a horizontal section *50b*, which connects with the inner fitting 53 and the elbow 54, the latter extending through the top section of the window frame and then a short distance downwardly, as illustrated in FIGURE 4, whereby section *54a* of the elbow is disposed on the outside of the window. A threaded bushing 55 is secured to the inside surface of pipe fitting 53, and a similar bushing 56 is attached to the inside surface of elbow section *54a*. Extending through each of said bushings is a pipe section which is rotatably secured in place. Specifically, referring to the assembly at pipe fitting 53 (FIG. 3), pipe section 57 extends through and is in rotatable engagement with said bushing 55, the uppermost portion of said pipe section 57 flaring outwardly into flange 58, which rests upon the upper annular edge 59 of bushing 55. Affixed to the pipe section 57 is the collar 60, the arrangement being such as to permit a rotation of the pipe section 57 within pipe fitting 53, while it is held against vertical movement. The pipe section 61 on the outside of the window is similarly rotatably connected to the bottom of the elbow 54.

Figures 5, 5A, 6, 6A, 7, 8, 9, 10, 11, 12, 13:
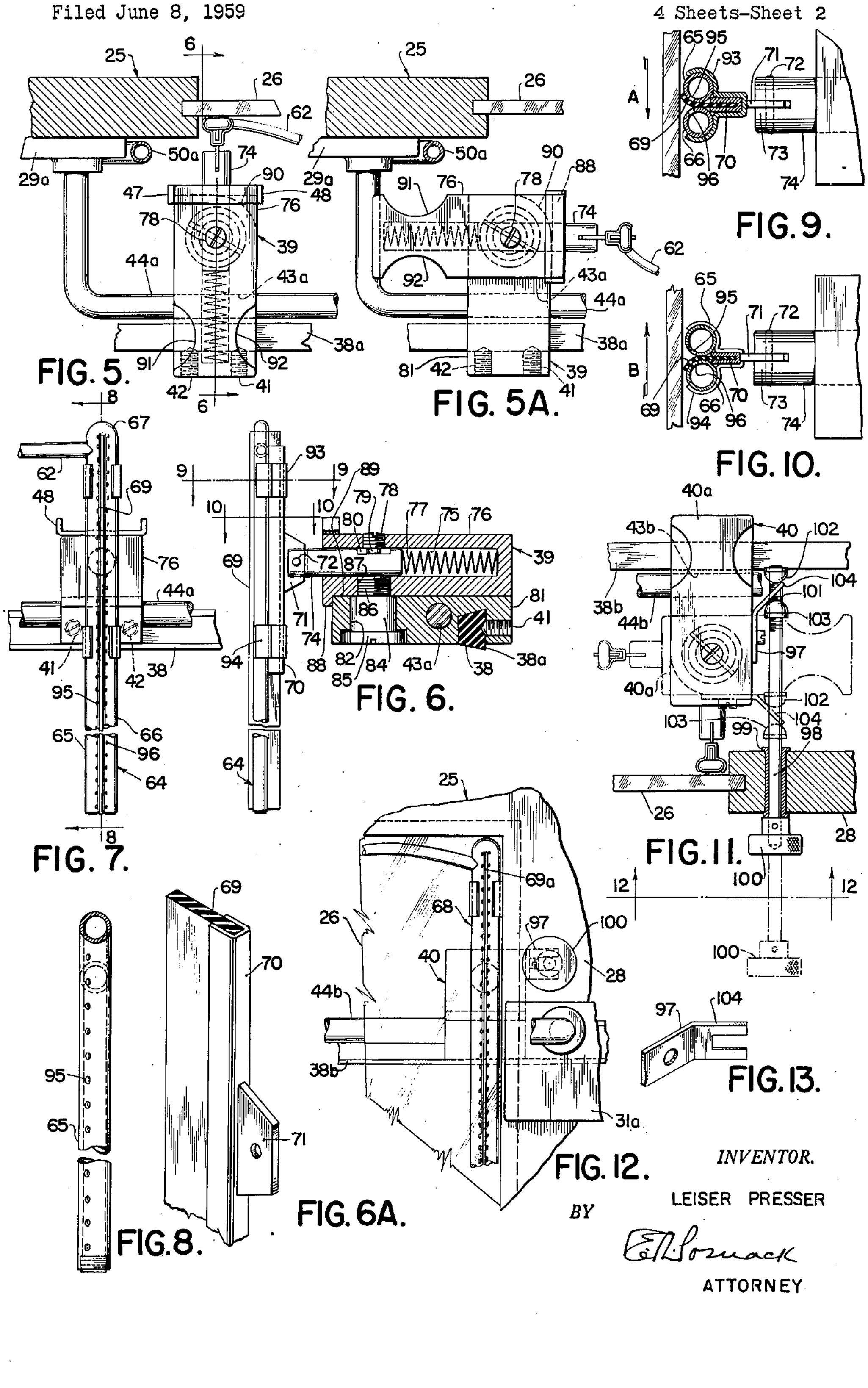
FIGURE 5 is an enlarged fragmentary section of FIGURE 1, showing the wiper carrier member in an operative position with the wiper element in engagement with the window pane.
FIGURE 5A is a view like FIGURE 5, but showing the carrier member in an operatively retracted position, with the wiper element out of engagement with the window pane.
FIGURE 6 is a section of FIGURE 5 taken along line 6—6.
FIGURE 6A is a fragmentary perspective view of the wiper bracket of FIGURES 5 and 5A.
FIGURE 7 is a fragmentary end view of FIGURE 6.
FIGURE 8 is a section of FIGURE 7 taken along line 8—8.
FIGURE 9 is a fragmentary horizontal section of FIGURE 6 taken along line 9—9, the wiper member being shown moving laterally in the direction indicated by the arrow.
FIGURE 10 is a section of FIGURE 6 taken along line 10—10, the wiper member being shown moving in the direction of the arrow opposite to that of FIGURE 9.
FIGURE 11 is a view, partially in section and somewhat enlarged, of the upper right hand side of FIGURE 2, the outside wiper carrier member and actuator being shown in full lines in their operative positions, and in dot-dash lines in their retracted positions.
FIGURE 12 is a front view of FIGURE 11, looking in the direction of arrows 12—12.
FIGURE 13 is a perspective view of the bifurcated carrier finger adapted for coactive engagement with the actuator.
Figure 14:
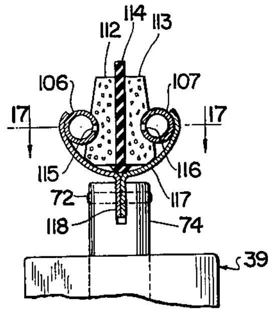
FIGURE 14 is a fragmentary horizontal section of a modified form of wiper member, this view being substantially like that of FIGURE 9.
Figure 15:
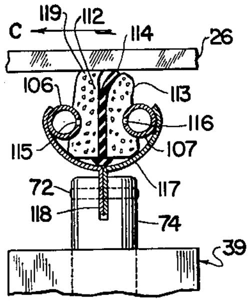
FIGURE 15 is a view substantially like FIGURE 14, but showing the wiper moving in the direction indicated by the arrow, with the wiper element in engagement with a window pane.
Figure 16:
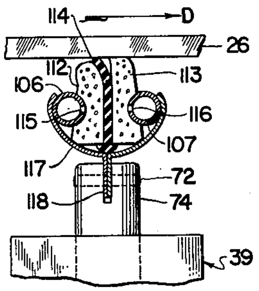
FIGURE 16 is a view like FIGURE 15, but showing the wiper member moving in the opposite direction.

The pipe section 51 is, in the form illustrated, continuous with the flexible hose 62; and the pipe section 61 is similarly continuous with the flexible hose 63. Hose 62 is affixed to and communicates with the interior of the wiper feed pipe member 64, the latter comprising two closely spaced vertical pipe sections 65 and 66 connected at the top 67. Similarly, the outside hose 63 is connected to the wiper feed pipe member 68. Referring to the structure of wiper feed pipe member 64, the vertical sections 65 and 66 thereof are spaced sufficiently apart to accommodate therebetween the flexible wiper element 69 (see FIGURES 5 to 10). Said wiper element is held by the channel bracket 70 the rear extension 71 of which is connected by the pin 72 to the bifurcated sections 73 of the carrier rod 74—the latter extending into the hollow passageway 75 of the upper retractable or rotatable component 76 of said carrier member 39, as shown in FIGURE 6. The spring 77 within passageway 75 engages the rear end of the rod 74 and yieldably urges it and the wiper element 69 against the window pane 26. Extending into the body of said rotatable component 76 is the stud 78, the lower extension 79 of which extends into the groove 80 of the rod 74, thereby to limit the operative movement of said rod.

As is evident from the drawings, it is the base or lower component 81 of the carrier member 39 which is mounted upon the belt 38 and through which the guide bar *44a* extends. The said lower component has a vertical passageway 82 extending therethrough, a cylindrical pivot pin 84, having a head 85, extending through said passageway 82—the terminal end portion 86 of said pivot pin 84 being threaded. Said terminal portion 86 is, in the form shown, of reduced diameter, and is in threaded engagement with the threaded recess 87 at the bottom of said rotatable component 76. It will be further observed that the said rotatable component 76 has a downwardly extending lip 88 which embraces and is in engagement with the upper forward surface 89 of the fixed carrier component 81. It will also be noted that said upper surface 89 contains a curved corner 90 (FIG. 5), and that said upper component 76 contains oppositely disposed finger depressions 91 and 92. The arrangement is such that the upper component 76 can be operatively rotated by grasping the depressed portions 91 and 92 thereof and swinging the said component clockwise, whereby it will be brought to the position shown in FIGURE 5A—the pivot pin 84 rotating within the said passageway 82 during such pivotal movement. Such a rotation will be effective in operatively retracting the wiper element from its operative engagement with the window pane.

The wiper-holding bracket member 70 is detachably secured to the pipe sections 65 and 66 by the clips 93 and 94. The outermost portion of the wiper element 69 extends forwardly beyond the said pipe sections 65 and 66, so that it will be enabled to flex in opposite directions during the wiping action. The said pipe sections 65 and 66 contain therein a plurality of spray apertures 95 and 96, these apertures being positioned in angular facing relation with respect to the window pane 26. The position of the apertures with respect to the wiper element 69 is such that when the wiper device is operatively moving in one direction, one set of apertures in one of the pipe sections is closed, while the other is exposed, and vice-versa. Thus, by referring to FIGURES 9 and 10, it will be seen that when the wiper moves in direction A, apertures 95 will be closed and apertures 96 exposed, whereby a water spray will be ejected through said apertures 96 to moisten the window during the advancing movement of the wiper element 69. And when the wiping action is reversed in the direction of arrow B (FIGURE 10), the flexible wiper element will bend in the opposite direction to seal off the apertures 96 and expose apertures 95, whereby the spray will be ejected through the latter apertures in front of the advancing wiper element. The arrangement is hence such that the wiper element serves as a closure valve in one of its positions, sealing off one row of apertures; and while performing this function it performs the wiping action coactively with the water sprayed from the opposing apertures.

In the operation of this device it is apparent that once the valve 52 is opened, water will be fed into the hose 62 and 63 and then into the respective feed pipe members 64 and 68—this action occurring while the belt 38 is moving first in one direction and then in the other. The operative movement of the carrier members causes the above-described wiping action of the opposing wipers 69 on the inside surface of the pane and 69*a* on the outside surface thereof—water being fed at all times in advance of the moving wipers. The guide bars 44*a* and 44*b* are effective in maintaining the carrier members along their predetermined paths, parallel to the plane of the window, regardless of the flexibility of belt 38—thereby assuring constant wiping action at all times. The rotatably mounted flexible hose 62 and 63 permit such action, without interfering with the stream of water being fed to the window surfaces. And the above-described valve action of the wiper elements 69 and 69*a* is effective in cutting off the water supply of one side, permitting only the spray of water on the operative side of the wiper—an arrangement which is economical in the use of water.

As aforesaid, when it is desired to retract the wiper element 69 from its enaging position with the window, all that need be done with carrier member 39 is to swivel it around, whereby the wiper element will be removed from its engaging-position with the window, thereby permitting convenient access to be had to the window.

While the outer carrier member 40 is constructed like that of inner member 39, I have provided it with means to enable it to be actuated from the inside, a bifurcated bracket 97 being attached to carrier 40 so that it could be operatively engaged by an actuator rod 98. As will be seen from FIGURE 11, the actuator rod 98 extends through the sleeve 99 in the side window section 28, the inner portion of said actuator carrying the knob 100. The actuator 98 has at the terminal portion 101 thereof the two spaced stop members 102 and 103—these being in threaded engagement with said terminal portion 101. When the carrier member 40 is in its extreme right hand position, as illustrated in FIGURE 11, the bifurcated terminal 104 of the bracket 97 straddles the terminal portion 101 of the actuator, so that it is positioned for engagement with the said stops 102 and 103. Hence, when the carrier member 40 is at its said extreme position, a pull exerted upon the knob 100 to the dot-dash position illustrated will cause the stop 102 to engage the bifurcated terminal 104 of the bracket 97, whereby the rotatable upper component 40*a* will be swung around to the dot-dash position illustrated, with the same effect as if said upper component were manually engaged in the manner above described. To return the said wiper to the operative position, the said knob 100 is pushed forwardly, whereby the stop 103 will engage the terminal 104 of the bracket and cause a clockwise rotation of the carrier to the full-line position illustrated.

FIGURES 14 to 17, inclusive, illustrate a modified form of wiper member carried by the rod 74 of the carrier member 39. The feed pipe member generally designated 105 comprises the two vertical pipe sections 106 and 107, the upper portions of said pipe sections being joined by the pipe fittings 108 and 109, the hose 62*a* communicating between said pipe sections 106 and 107 and a suitable source of water supply, such as a pipe equivalent to pipe 50 above described. Plugs 110 and 111 at the bottom of pipe sections 106 and 107 permit drainage thereof. Positioned between said pipe sections 106 and 107 are the water absorbing strips 112 and 113, flanking the flexible wiper element 114. Said pipe sections 106 and 107 contain therein rows of apertures 115 and 116, respectively, these apertures being covered by the said water absorbing strips 112 and 113. The pipe sections 106 and 107, the strips 112 and 113, and the wiper element 114 are maintained as a unit by the bracket 117—said bracket containing the rear extension 118 which is supported, in the manner aforesaid, by the pin 72 and the bifurcated terminal of rod 74.

In the operation of the device in FIGURES 14 to 17, it will be seen that when the wiper member moves in the direction of arrow C (FIG. 15), the end of the wiper element 114, engaging the window pane 26, is deflected to the right, compressing the strip 113 and thereby reducing the water holding capacity thereof below that of strip 112. The arrangement is such that strip 112 freely absorbs water from the apertures 115 and, with the outer end 119 thereof, moistens the window pane 26 in advance of the moving wiper element 114. While this occurs, the strip 113 is pressed away from the window pane 26 and is either entirely out of engagement therewith, or in very slight bearing engagement therewith, with no moistening action, or a reduced moistening action. Upon the reversal of the wiper member in the direction of arrow D (FIG. 16), strip 112 is compressed and strip 113 permitted to perform the aforesaid wiping action. It is evident that with this form of my invention there is no direct impingement of a water spray on the glass, but rather a combined wiping and moistening action by the water absorbing strips 112 and 113.

Figures 17, 18, 19, 20:
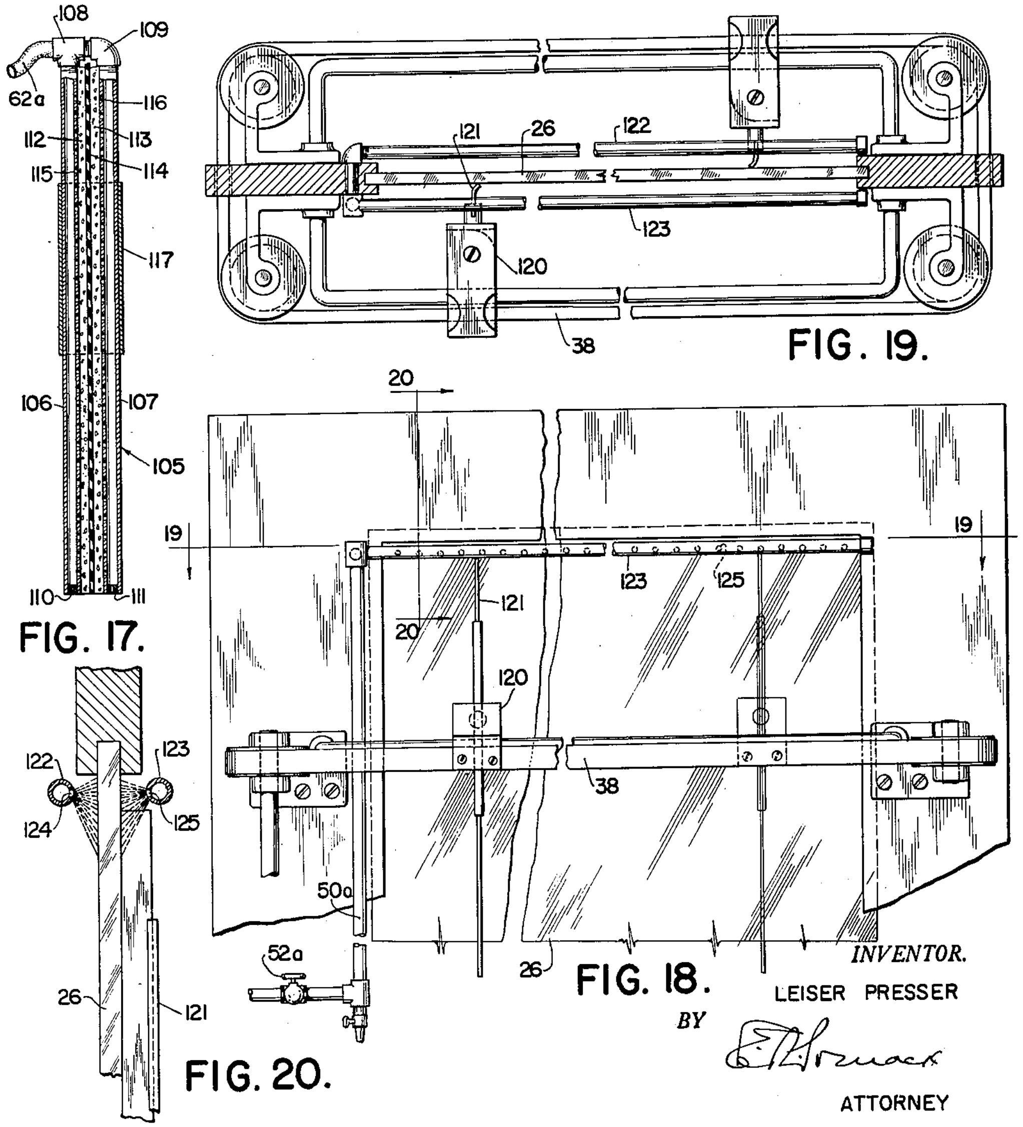
FIGURE 17 is a longitudinal section of FIGURE 14 taken along line 17—17.
FIGURE 18 is a fragmentary front view of a window structure provided with another form of my invention.
FIGURE 19 is a section of FIGURE 18 taken substantially along line 19—19.
FIGURE 20 is a fragmentary section of FIGURE 18 taken along line 20—20, showing the path of opposite sprays of water directed upon the window pane.

In the form of my invention illustrated in FIGURES 18 to 20, the carrier member 120 is operatively supported by the belt 38, substantially in the manner above described—said carrier member operatively supporting the wiper element 121 which, in this embodiment, is of conventional construction. The moistening of the window is effected by means of two horizontally disposed feed pipe members 122 and 123, these having spray apertures 124 and 125, respectively, directed toward the window, as shown in FIGURE 20. Said feed pipe members 122 and 123 are operatively connected to a riser 50*a*, substantially like riser 50, in the form first above described.

In the operation of this form of my invention a main valve 52*a* is opened, thereby providing a flow of water to the pipe sections 122 and 123 which provide the spray on both sides of the window. The operative reciprocal movement of the carrier member 120 and its wiper element 121, in the manner aforesaid, thus produces a wiping and cleaning action on both sides of the window pane 26 in cooperation with the spray from pipes 122 and 123.

Figures 21, 22:
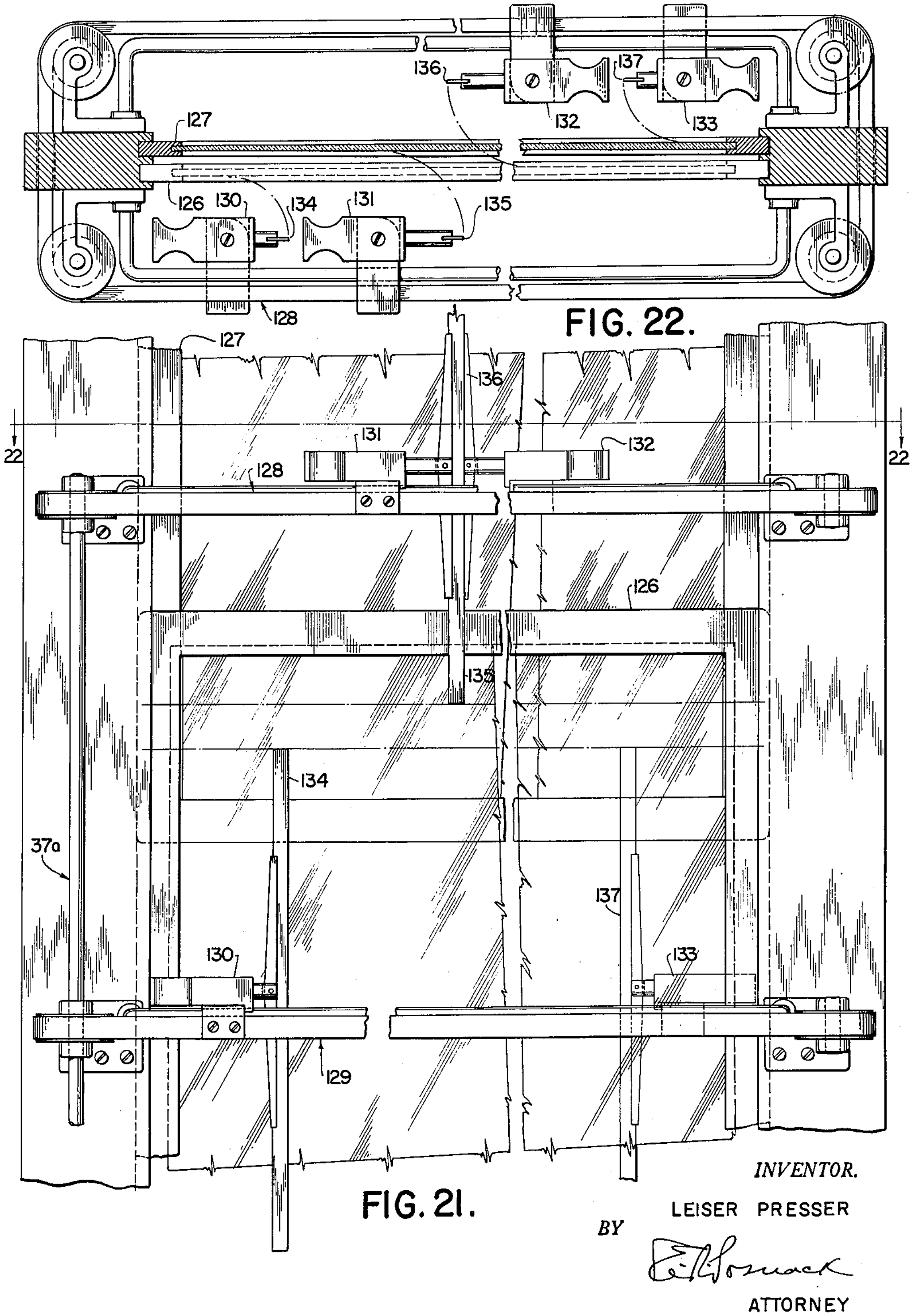
FIGURE 21 is a fragmentary front view of a double-hung window, each window section being provided with separate wiper devices, said devices being shown in their operatively retracted positions.
FIGURE 22 is a section of FIGURE 21 taken substantially along line 22—22, the dot-dash arcs showing the paths of the respective wiper elements when the wiper members are operatively moved to their respective operative positions.

FIGURES 21 and 22 show my invention applied to a double-hung window comprising window sections 126 and 127. In this embodiment of my invention there is an upper belt and carrier assembly generally designated 128, and a lower belt and carrier assembly 129, each being substantially like the corresponding assemblies above described, except that the drive shaft 37*a* is operatively connected to both of said assemblies. The inside carrier members 130 and 131, and the outside carrier members 132 and 133, are shown in full lines in their operatively retracted positions, whereby the respective wiper elements 134, 135, 136 and 137 are out of engagement with the windows. The arrangement is hence such that the windows can be raised and lowered, and repaired if necessary, without any interference by the window wiping members. When it is desired to operatively clean the opposite sides of windows 126 and 127, the carrier members are rotatably manipulated, in the manner above described, to swing the said wiper elements, along the dot-dash arcs illustrated, to their respective operative window-engaging positions. The reciprocating action of the device, and the wiping action of the wiper elements, is effected substantially in the manner hereinabove described with respect to the other embodiments of my invention.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a window cleaning device, a wiper member positioned for engagement with a window pane, water supply means in coactive relation to said member, a movable carrier member supporting said member, actuating means for moving said carrier member along a path parallel to said pane, said carrier member comprising a base component and a retractable component connected to said base component, said actuating means being attached to said base component and said wiper member being attached to said retractable component, said actuating means comprising a movable belt attached to said base component of the carrier member, and a plurality of pulleys on which said belt is operatively mounted, said retractable component being rotatably connected to said base component and being movable from an operative position where said wiper member is in operative engagement with the window pane to a retracted position where said wiper member is out of engagement with said pane, and rigid guide means parallel to said pane and in slidable engagement with said base component, whereby the belt-actuated wiper member assembly is at all times maintained along said parallel path.

2. In a window cleaning device, two wiper members on opposite sides of a window, a carrier member for each of said members, a movable belt supporting said carrier members, a plurality of pulleys on which said belt is operatively mounted, actuating means for said belt, front and rear rigid guide bars in spaced parallel relation to the respective front and rear surfaces of said window, said carrier members each comprising a base component affixed to said belt and a retractable component rotatably connected to said base component, said base components having apertured portions through which said respective front and rear guide bars slidably extend, said retractable components supporting said respective wiper members, each of said latter components being rotatably movable from an operative position where the supported wiper is in operative engagement with the adjacent surface of the window to a retracted position where said wiper member is out of engagement with said window.

3. In a window cleaning device, a wiper member positioned for engagement with the outside surface of a window pane, a movable carrier member supporting said member, actuating means for moving said carrier member along a path parallel to said pane, said carrier member comprising a base component and a rotatable component, said actuating means being attached to said base component and said wiper member being attached to said rotatable component, said latter component being movable from an operative position where said wiper member is in operative engagement with the window pane to a retracted position where said wiper member is out of engagement with said pane, rigid guide means parallel to said pane and in slidable engagement with said base component, and an actuator rod connected to said rotatable component for moving it between its said operative and retracted positions.

References Cited in the file of this patent

UNITED STATES PATENTS

| | | |
|---|---|---|
| 1,675,816 | Mokma | July 3, 1928 |
| 1,691,819 | Langley | Nov. 13, 1928 |
| 1,766,550 | Schubert | June 24, 1930 |
| 2,013,200 | Conway | Sept. 3, 1935 |
| 2,348,502 | Smulski | May 9, 1944 |
| 2,717,408 | Le Page | Sept. 13, 1955 |
| 2,885,708 | Presser | May 12, 1959 |